Nov. 25, 1969  R. K. BOYER  3,479,868
GAUGE FOR DETERMINING AND ADJUSTING PRESSURE
IN TWO CHAMBER TIRE
Filed April 1, 1968
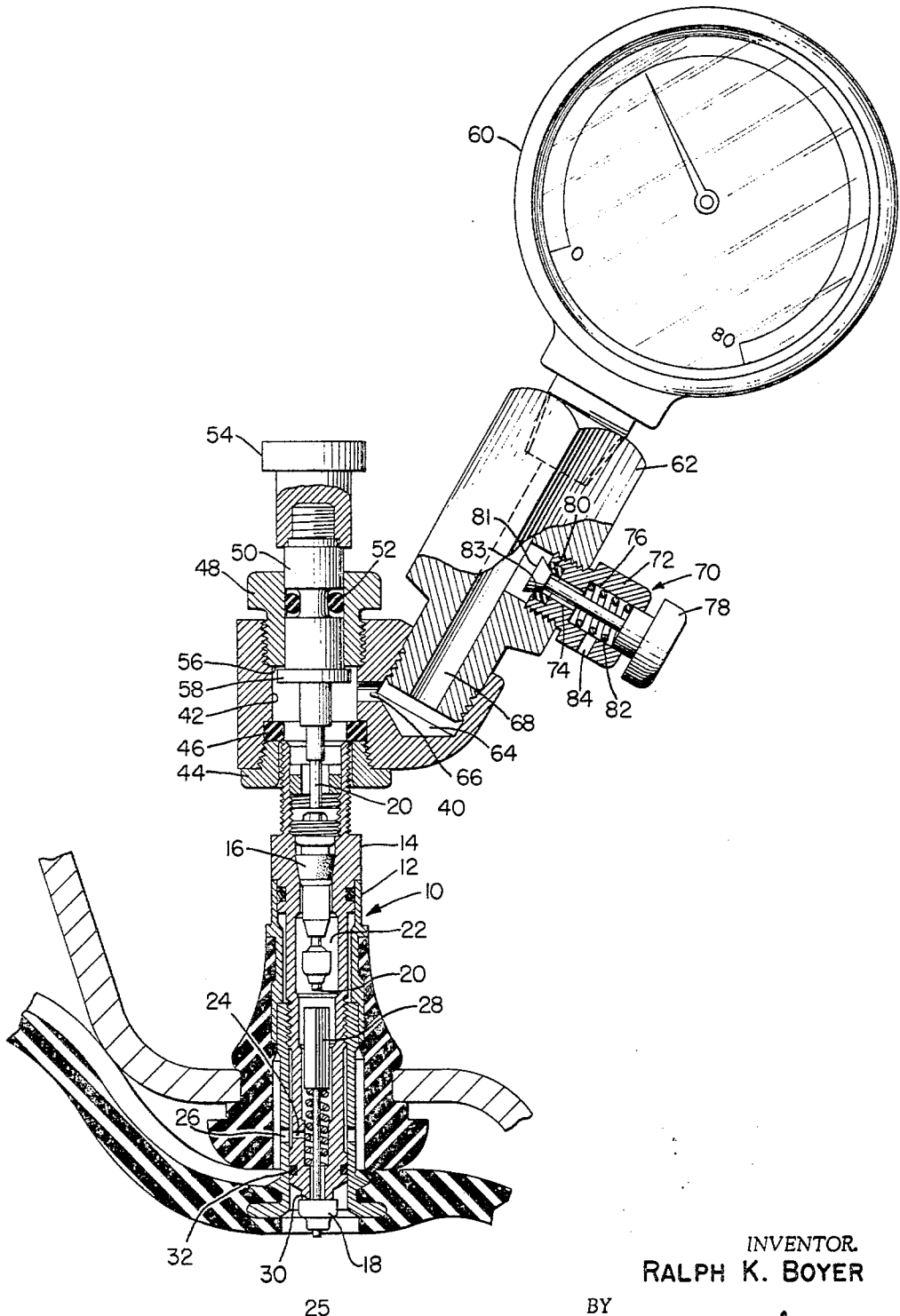
INVENTOR.
RALPH K. BOYER
BY
M William Goodwin
ATTORNEY

United States Patent Office 3,479,868
Patented Nov. 25, 1969

3,479,868
GAUGE FOR DETERMINING AND ADJUSTING
PRESSURE IN TWO CHAMBER TIRE
Ralph K. Boyer, Cleveland, Ohio, assignor to The Goodyear Tire & Rubber Company, Akron, Ohio, a corporation of Ohio
Filed Apr. 1, 1968, Ser. No. 717,805
Int. Cl. B60c 23/02
U.S. Cl. 73—146.8    5 Claims

ABSTRACT OF THE DISCLOSURE

A gauge for selectively measuring the pressures in each of two chambers of a two chamber tire. The gauge includes a chuck portion which is engageable over the outer end of a valve assembly through which air passes into the two chambers of the tire. The gauge has a manually operable plunger for displacing an actuating member or pin in the valve assembly from a first position wherein one of the chambers of the tire is in communication with the gauge and a second position wherein the other of the chambers of the tire is in communication with the gauge. The gauge also includes a manually operable bleeder valve for release of air from either of the chambers of the tire depending on the position of the plunger of the gauge.

In order to understand the full nature and extent of the technical disclosure of this application, reference must be made to the accompanying drawing and the following detailed description.

This invention relates to dual chamber tires and more particularly to a novel and improved gauge for selectively measuring the different pressures in each of the two chambers of the tire, and also for selectively reducing the air pressure in the chambers of the tire.

Duel chambered tires, such as for example, but not limited to a tire as shown in U.S. Patent No. 3,361,153 are well known. Such a tire may be provided with a valve assembly which generally provides for selective inflation of the two chambers of the tire to different operating pressures. After the tire has been inflated it is desirable to check the pressures in the two chambers to be sure the pressures are within desired ranges. Heretofore special adaptors and the like have been required in order to permit the checking or measurement of the pressures in the two chambers of the tire.

It is the object of this invention to provide a novel and improved gauge which may be applied to a valve assembly on a two chamber tire and which is operable to measure selectively the pressures in the two chambers of the tire without the use of special adaptors or the like.

It is also an object of the present invention to provide a gauge of the type described including means for selectively reducing the pressure in either of the two chambers of the tire.

Other objects will be in part obvious, and in part pointed out more in detail hereinafter.

In the drawing there is shown an elevational view, partly in section, of a gauge constructed in accordance with the present invention and in operative relationship with a dual valve assembly of a type with which the gauge is adapted for use.

With reference to the drawing, a valve assembly of a type with which the gauge of this invention is adapted for use is generally indicated at 10 and comprises a valve stem 12 within which is received a housing 14. The housing 14 in turn receives a pair of axial aligned valves 16 and 18. The outer valve 16 is provided with a pin 20 which when moved inwardly of the valve will permit passage of air through the valve into the chamber 22 interiorly of the housing 14. The chamber 22 is adapted to communicate with the external chamber of a two chamber tire through an opening 24 in the housing 14 and openings 26 in the valve stem 12. The inner valve 18 is provided with a pin 28 which when moved inwardly of the valve provides communication between the chamber 22 and the inner chamber 25 of the tire with which the valve is associated by means of an outlet port generally indicated at 30 in the valve assembly. The pin 20 of the outer valve 16 will open the outer valve in response to movement of the pin inwardly of the valve. The pin 20 is permitted movement in excess of that required merely to open the valve 16 so as to permit engagement of the pin 20 with the pin 28 of the inner valve 18 whereupon continued inward movement of the pin 20 will effect inward movement of the pin 28, thus to open the inner valve 18. A seal 32 adjacent the end of the stem 12 associated with the outlet opening 30 assures that unless the inner valve 18 is opened there will be no communication between the chamber 22 and the outlet port 30 of the valve assembly.

The gauge of this invention comprises a body 40 having a bore or passage 42 extending therethrough. Within one end of the bore 42 is received an adaptor or chuck ring 44 which is engageable over the outer end of the valve 10 in the usual manner. An annular seal 46 is carried by the body 42 next adjacent the chuck adaptor 44 and is engageable with the outer end of the valve stem 12 in order to provide an airtight seal at this point. Mounted on the body 40 so as to form a part thereof and extending into the end of the bore 42 opposite the chuck adaptor 44 is a bushing 48 having an opening extending coaxially therethrough to form an extension of the bore 42. An elongated plunger 50 is slidably received coaxially within a bushing 48. A toroidal seal 52 is carried by the plunger 50 in engagement with the wall of the opening through the bushing 48. The plunger 50 extends outwardly beyond the bushing 48 and at its outer end is provided with an enlarged portion 54, one end of which is engageable with the bushing 48 so as to provide stop means for the plunger 50 limiting movement of the plunger in a direction corresponding to movement of the end portion 54 toward the bushing 48.

The inner end of the bushing 48 provides an annular shoulder 56 disposed coaxially of the bore 42 and extending generally radially thereof while facing the end of the bore within which is mounted the chuck ring 44. The plunger 50 is provided with a radially extending flange 58 which is engageable with the shoulder 56 to limit movement of the plunger in a direction inwardly of the bore 42 from the chuck ring 44. When the flange 58 is engaged with the shoulder 56, the end of the plunger next adjacent the chuck ring 44 is engageable with the pin 20 of the valve 10, as the gauge is engaged with the valve as shown, to move the pin 20 inwardly of the valve sufficiently to open the outer valve 16. Accordingly, the bore 42 will be in communication, at this time, with the outer chamber of a tire associated with the valve assembly.

The pressure of the outer chamber will be indicated on a pressure gauge 60, which is of the conventional type and is supported on the body 40. More particularly, a fitting 62 is threadably engaged at one end within an opening 64 in the body 40. A passage 66 in the body 40 connects the bore 42 with the opening 64. The fitting 62 is provided with an air passage 68 extending longitudinally therethrough. The passage 68 opens at one end into the opening 64 in the body 40 and at the other end communicates with the gauge 60.

When it is desired to measure the pressure in the inner chamber of a tire associated with the valve 10, the plunger 50 is depressed to advance the plunger and cause the pin 20 of the valve 16 to be moved inwardly of the valve so as to engage and displace the pin 28 and open the inner valve 18. At this time the gauge 60 will be exposed to the pressure of the inner chamber 25 of the tire. From a consideration of the drawing and the foregoing description of the valve 10, it will be apparent that when the valve 18 is opened, the valve 16 will also be open. Thus, the chamber 22 in the valve will be exposed to the pressure in both chambers of the tire. However, the inner chamber pressure will be the higher of the two pressures and thus the gauge 60 will indicate the inner chamber pressure.

In order to permit adjustment of the pressures of the two chambers of the tire at the same time that the pressures are being measured, the fitting 62 is provided with a manually operable bleeder valve 70. The valve 70 comprises a body 72 threadably mounted at one end on the fitting 62. The body 72 has coaxial opening 74 extending therethrough. The opening 74 is enlarged at its outer end to provide a chamber 76. A valve member 78 extends coaxially through the opening 74 and at its inner end has a closure portion 81 sealingly engaged with a seal 80 carried by the body 72. A spring 82 maintains the valve 70 normally closed. Movement of the outer end of the valve member inwardly of the body will unseat the closure portion 81 and permit air to bleed from the passage 68 through the opening 83 in the fitting 62, the passage 74 in the body 72 and out to atmosphere through a bleed passage 84 in the body 72 and leading from the chamber 76. The chamber from which air will be bled will depend on the positioning of the plunger 50.

Thus, it will be seen that there has been provided a novel and improved gauge which may be used without any special adaptors or the like to selectively measure the pressures of the inner or outer chamber of a two chamber tire, and further which will permit adjustment of the pressures in the two chambers selectively.

Inasmuch as many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A gauge for checking the pressure in the chambers of a two chamber tire, comprising a body having at one end chuck means engageable with one end of a dual valve assembly of a type having a movable actuating member positionable in a first position corresponding to communication of said one end of the valve assembly with one of said chambers and in a second position corresponding to communication of said one end of said valve assembly with at least the other of said chambers, pressure indicating means supported on said body and communicating with said chuck means, a manually displaceable member carried by said body for movement in opposite directions relative thereto and having one end which is engageable with said actuating member to move the same into said first position when the chuck means is engaged with said one end of the valve assembly, and stop means limiting movement of said displaceable member in both directions of movement thereof, said displaceable member being mounted for sufficient movement in one direction to effect positioning of said actuating member in said second position in response to movement of said displaceable member in said one direction.

2. A gauge described in claim 1, including means providing an air passage communicating at one end with said chuck means and at the other end with said pressure indicating means, and a manually operable bleeder valve connected to said air passage.

3. A device for checking the pressures of the chambers of a two chamber tire, comprising chuck means including a body having a bore within one end of which is receivable a tire valve assembly, a plunger coaxially received in said bore for movement longitudinally thereof, one end of said plunger being disposed adjacent said one end of said bore, the other end of said plunger extending outwardly of the other end of said bore, means providing a shoulder on said body intermediate the ends of said bore, said shoulder extending radially inwardly of said bore and facing said one end of said bore, means on said plunger engageable with said shoulder to limit movement of said plunger toward said other end of said bore, a pressure gauge, means mounting said gauge on said body and including an air passage communicating at one end with said gauge and at the other end with said bore, said other end of said passage being spaced between said shoulder and said one end of said bore, means on said plunger engageable with means on said body to limit movement of the plunger toward said one end of said bore, said plunger having a diameter over the portion thereof extending from the other end of said passage toward said one end of said bore which is less than the diameter of the corresponding portion of the bore to provide a passage from said one end of said bore into communication with said one end of said air passage.

4. A device for checking the pressures of the chambers of a two chamber tire, comprising chuck means including a body having a bore within one end of which is receivable a tire valve assembly, a plunger coaxially received in said bore for movement longitudinally thereof, one end of said plunger being disposed adjacent said one end of said bore, the other end of said plunger extending outwardly of the other end of said bore, an annular seal engaged between said plunger and said bore, means providing an annular shoulder on said body between said seal and said one end of the bore, said shoulder being coaxial with and extending radially inwardly of said bore and facing said one end of said bore, an annular flange on said plunger engageable with said shoulder to limit movement of said plunger toward said other end of said bore, a pressure gauge, means mounting said gauge on said body and including an air passage communicating at one end with said gauge and at the other end with said bore, said other end of said passage being spaced between said shoulder and said one end of said bore, stop means on said plunger engageable with said body to limit movement of the plunger toward said one end of said bore, said plunger having a diameter over the portion extending from said shoulder toward said one end of said bore which is less than the diameter of the corresponding portion of the bore to provide a passage from said one end of said bore into communication with said other end of said air passage.

5. A device as described in claim 4, including a manually operable bleeder valve supported on said body and having an inlet communicating with said air passage and an outlet communicating with atmosphere.

References Cited

UNITED STATES PATENTS 1,302,443   4/1919   Shwab _____ 137—227

FOREIGN PATENTS 585,682   2/1947   Great Britain.

LOUIS R. PRINCE, Primary Examiner